US006481378B1

(12) United States Patent
Zemach (10) Patent No.: US 6,481,378 B1
(45) Date of Patent: Nov. 19, 2002

(54) FISH FARMING SYSTEM AND METHOD

(75) Inventor: Shalom Zemach, Kfar Yona (IL)

(73) Assignee: Fishfarm Tech Ltd., Grand Cayman (KY)

( * ) Notice: Subject to any disclaimer, the term of this patent is extended or adjusted under 35 U.S.C. 154(b) by 136 days.

(21) Appl. No.: 09/659,423

(22) Filed: Sep. 11, 2000

(51) Int. Cl.$^7$ .............................................. A01K 61/00
(52) U.S. Cl. ...................................................... 119/223
(58) Field of Search ........................... 43/102, 103, 4.5, 43/4, 6.5; 119/208, 223, 238, 239, 240; 441/78, 45, 25

(56) References Cited

U.S. PATENT DOCUMENTS

| 3,428,977 | A | * | 2/1969 | Jones |
| 3,570,437 | A | * | 3/1971 | Davis, Jr. |
| 3,680,160 | A | * | 8/1972 | Heikki |
| 4,028,759 | A | * | 6/1977 | Toups |
| 4,147,130 | A | * | 4/1979 | Goguel ........................ 119/223 |
| 4,244,323 | A | * | 1/1981 | Morimura .................... 119/223 |
| 4,487,588 | A | * | 12/1984 | Lewis et al. ................... 441/43 |
| 4,596,146 | A | * | 6/1986 | Usmar et al. .................. 73/639 |
| 5,129,848 | A | * | 7/1992 | Etheridge et al. .............. 441/2 |
| 5,251,571 | A | * | 10/1993 | Willinsky et al. ............ 114/256 |
| 5,283,767 | A | * | 2/1994 | McCoy ........................ 114/331 |
| 5,359,962 | A | * | 11/1994 | Loverich ..................... 119/223 |
| 5,655,938 | A | * | 8/1997 | Huguenin et al. ............. 441/29 |
| 5,816,874 | A | * | 10/1998 | Juran et al. ..................... 441/1 |
| 5,845,602 | A | * | 12/1998 | Kaarstad et al. ............. 119/223 |
| 5,970,917 | A | * | 10/1999 | Keith, Jr. ..................... 119/223 |

* cited by examiner

Primary Examiner—Thomas Price
(74) Attorney, Agent, or Firm—Mark M. Friedman (57) ABSTRACT

The invention provides a deep-water fish farming system comprising a fish cage of controllable buoyancy having one or more chambers, which can be submerged and refloated at a controllable rate to any depth. A winch mechanism mounted preferably on a platform that covers a section of the cage releases and gathers a cable connected to a sinker. When the combined weight of the system overcomes the buoyancy, the fish cage is submerged to a depth determined by the effective length of the cable between the winch mechanism and the sinker, with the sinker touching the sea bottom. The submerged cage is refloated to the surface by remotely activating the winch mechanism, thus releasing the cable, while keeping the sinker on the sea bottom. When the cage is refloated to the surface, the buoyancy is increased to allow pulling of the sinker from the bottom. The invention further provides a method for submerging and raising a fish cage at a controlled rate to any desired depth in deep water.

16 Claims, 8 Drawing Sheets

FISH FARMING SYSTEM AND METHOD

FIELD AND BACKGROUND OF THE INVENTION

The present invention relates to systems for farming aquatic animals in cages and, more particularly, to fish farming systems having a cage which can be submerged and refloated as desired, and to a method for submerging and refloating a fish cage as desired. While specifically referring hereafter to "fish", it is understood that the farming system of the present invention may be used to raise other aquatic animals, e.g. shrimp, oysters, etc.

Considerable efforts have been made in an attempt to supply the rapidly increasing worldwide demand for fish protein. In addition to increasingly sophisticated open sea fishing, a significant fraction of the fish on the market today is raised and harvested using modern aquaculture techniques. Various fish farms have been successfully operating in large man-made pools. However, these farms are expensive to build and operate and do not always make it possible to reproduce optimal conditions for the growth of the fish.

More recently, fish farming has been increasingly carried out in large cages, which are made to float near or at the water surface just offshore (hereinafter "near shore") in seas, lakes or other natural bodies of water. A fish cage system includes one or more large cages which are typically constructed of a rigid frame of some suitable shape and covered by netting which allows water to flow freely into and out of the cage, but which is of sufficiently fine mesh as to retain the fish inside the cage.

The advantage of such fish cage systems is that they do not take up scarce real estate and do not require the building of an expensive pool. Furthermore, the water conditions (e.g., salinity, temperature, oxygen content, and the like) approximate natural conditions in the open body of water, and may be more optimal for the growth of the fish than conditions simulated in man-made onshore pools.

While the near shore deployment of such fish cages is convenient in terms of accessibility, such deployment suffers from certain disadvantages. As near shore aquaculture develops there is an increasing shortage of quality sites in which to locate additional cages. Many sites suffer from oxygen depletion caused by fish waste and uneaten fish food as well as from industrial, agricultural and domestic runoffs from the nearby shore.

It is therefore often advantageous to avoid onshore locations and to locate the cages farther offshore, in what will be referred to hereafter generically as "deep waters", i.e. in areas, which are not adversely affected by runoffs and where the greater water circulation serves to dilute fish farm wastes.

However, locating fish cage systems in locations that are remote from the shore poses certain problems. Chief among these is the need to ensure the seaworthiness of the fish cage system in conditions, such as large waves and strong winds during storms, which may be much more severe than those experienced by near shore structures.

Furthermore, it is known that during storms when the water near the water surface is particularly turbulent, fish, which normally spend most of the their time near the water surface where the supply of oxygen is most abundant, tend to temporarily relocate themselves away from the surface to depths where the water is relatively unaffected by the storm and thus avoid damage and stress to themselves.

To minimize or eliminate damage to both the fish and the cages, several fish cage systems have been developed which make it possible to submerge the fish cage to a certain depth when desired, e.g., prior to the onset of a storm, to avoid cold surface water and/or surface ice in winter and hot surface water in summer, or to avoid various toxic contaminants, such as toxic plankton blooms or an oil spill. Zemach et al. in U.S. Pat. No. 5,412,903 which is incorporated herein for all purposes as if fully set henceforth, describe several such previous cage systems, and propose a fish cage system which overcomes some major previous disadvantages and limitations.

Figure 1:
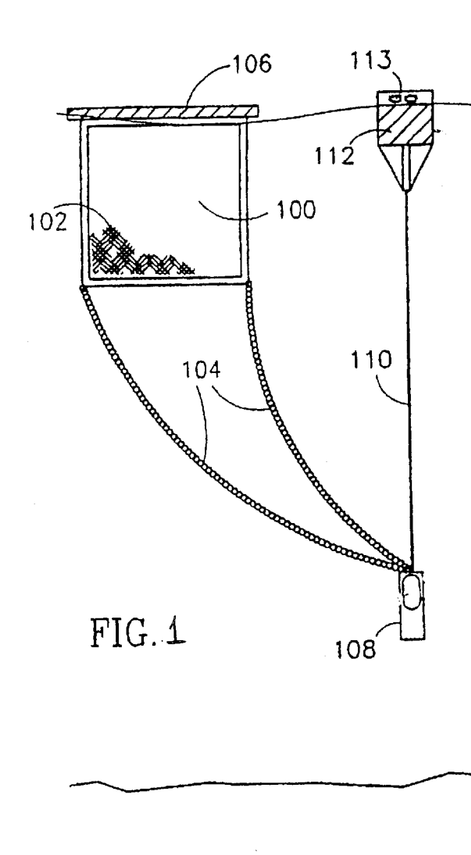
FIG. 1 is a schematic description of a prior art fish cage floating at the water surface.
Figure 2:
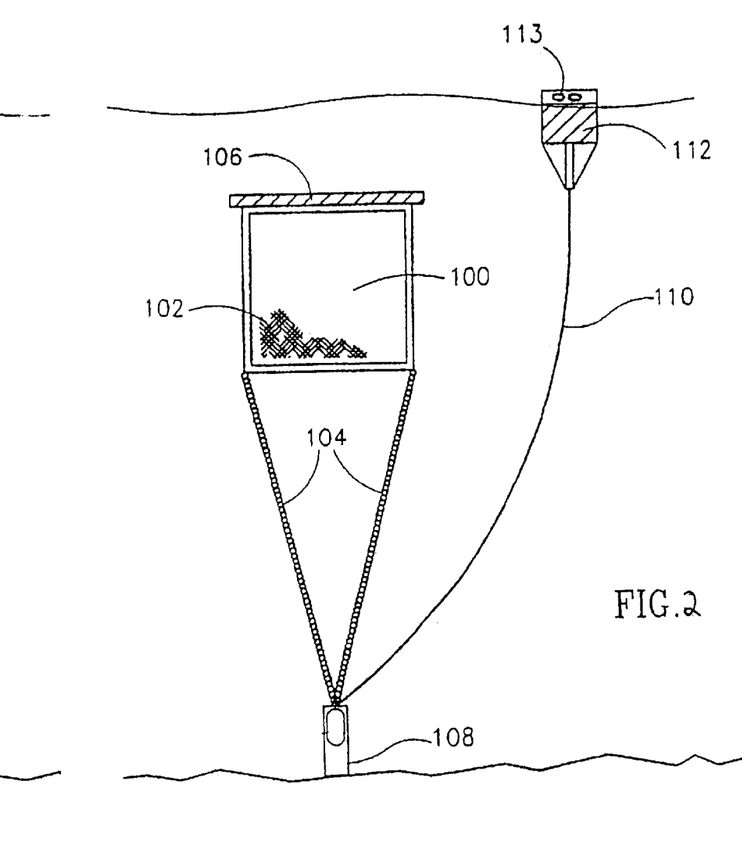
FIG. 2 is a schematic description of the prior art fish cage of FIG. 1 in a submerged state.

FIGS. 1 and 2 depict schematically a prior art fish cage according to Zemach et al. in '903, in which some of the original details have been omitted. FIG. 1 shows a fish cage 100, typically made of a metal skeleton structure on which is superimposed a netting 102 (shown partially) of suitable mesh size which allows water to flow freely through cage 100 but does not allow fish inside cage 100 to escape. Attached to cage 100 are one or more fish cage cables 104. Cage 100 and cables 104 have combined upward buoyancy imparted through buoyancy chambers or members 106, which ensures that at least, the upper part of cage 100 floats at or above the surface of the water. In cases requiring the temporary lowering of cage 100 to a certain depth, the system is further equipped with a sinker 108 which is connected to cable 104. According to '903, in a basic embodiment sinker 108 is of fixed and invariable weight which is selected to overcome the combined net buoyancy of cage 100 and cage cables 104 described above, so that when the weight of sinker 108 is added to fish cage 100 and fish cage cables 104 the result is the submersion, preferably at a slow and controlled rate, of cage 100. In another embodiment, sinker 108 is of variable buoyancy, with means provided to increase the buoyancy by introducing air, and to reduce the buoyancy by releasing air, even when sinker 108 is submerged.

Sinker 108 is further connected to a sinker cable 110, which is also connected to a buoy 112 of any suitable design. Buoy 112 is designed to float at the water surface under all conditions. Buoy 112 is equipped with means for alternately shortening and lengthening the effective length of sinker cable 110, means which is preferably a suitable winch mechanism 113 housed within buoy 112, typically one which is operated by an internal combustion engine.

During normal operations, cage 100 is allowed to float at the water surface, as shown in FIG. 1. As described above, the buoyancy of cage 100 (plus fish cage cables 104) is such that cage 100 remains at the water surface. In this condition no external forces are exerted on fish cage cables 104 which stay slack in the water, since sinker 108 to which they are also connected is being fully supported by buoy 112, through sinker cable 110 which is taut (FIG. 1). Buoy 112 is designed to have sufficient buoyancy to support sinker 108 (and sinker cable 110) while still floating at the water surface.

Whenever it desired to submerge cage 100, sinker cable 110 is allowed to lengthen, preferably at a controlled rate, by, for example, releasing a brake mechanism on the winch 113 housed in buoy 112. The weight of sinker 108 then pulls sinker cable 110 out of winch 113, causing it to lengthen as sinker 108 goes deeper. As sinker 108 continues to go deeper there comes a point when fish cage cables 104 become taut, shifting the weight of sinker 108 from sinker cable 110, which becomes slack, to fish cage cables 104 which become taut. Beyond this point, the full weight of sinker 108 is exerted on cage 100. As described above, the incremental weight of sinker 108 is sufficient to overcome the buoyancy of cage 100 and brings about the submersion of cage 100, as shown in FIG. 2 of the prior art.

Preferably, the submersion takes place at a slow rate in order to minimize or eliminate damage to the structures and to the fish. Such a slow rate of submersion can be assured, for example, by carefully selecting the weight of sinker 108 so that the combined weight of the system is just slightly larger than the upwardly directed buoyancy forces. The submersion of cage 100 continues as long as sinker 108 exerts forces on cage 100. As soon as sinker 108 hits bottom these forces are eliminated and cage 100 ceases to move downwardly. Instead, cage 100 stabilizes at a location, which is determined by the length of fish cage cables 104 (FIG. 2).

The system described in '903 can submerge the cages to virtually any desired depth, provided there is a sufficient length of sinker cable 110. To locate the submerged cage at a certain depth, without regard to the depth of the water, all that is required is the correct length of fish cage cables 104. For example, if it is desired to operated in waters of 200 meters depth and if it is further desired to submerge the cages to a depth of approximately 100 meters, it is required that sinker cable 110 be at least 200 meters long and that fish cage cables 104 be approximately 100 meters long.

Once it is desired to have cage 100 resume its normal position at the water surface, winch 113, or a similar mechanism, is activated to take up sinker cable 110. When sinker cable 110 becomes taut, winch 113 lifts sinker 108 off the bottom and removes its weight from cage 100 whose buoyancy forces now allow it to climb to the surface, preferably at a sufficiently slow rate to avoid structural damage to the system and physiological damage (e.g., the bends) to the fish. Preferably, the lower portions of buoy 112 are shaped to avoid being lifted by cage 100 when cage 100 is raised to the water surface. For example, the lower portions of buoy 112 as shown in FIGS. 1 and 2 are shaped so that as cage 100 is raised to the water surface, cage 100 tends to push buoy 112 away as the upper edge of cage 100 slides up along the ramped lower portions of buoy 112.

Despite the clear advantages it has over prior art systems, the fish cage system of Zemach et al. in '903 still suffers from a number of problems and disadvantages, some of which are listed below, and which the present invention aims to redress:

One problem arises when cage 100 floats at or near the water surface in weather that is difficult but not stormy enough to warrant submersion of the cage (for example in waves of 0.8–1.8 meter height). In this situation, there are frequent collisions and friction between cage 100, in particular its members 106 and buoy 112. The cage and the buoy have very different floating characteristics on the water, resulting in frequent collisions between them, collisions that cause cumulative damage to both. In emergencies, for example when winch 113 gets stuck and needs to be freed, personnel needs to board buoy 112, and if this action is required in bad weather, it can be life-threatening to the boarding party.

Another problem arises if sinker 108 gets stuck in the muddy or stony sea bottom. This contingency requires buoy 112 to have extra buoyancy (be larger), so that it does not sink itself when it tries to free the stuck sinker. Similarly, winch 113 needs extra pulling capacity for the same reason. These extra requirements make buoy 112 and winch 113 more expensive. Since both the buoy and the winch remain floating in stormy weather while the cage is submerged, damage to either buoy 112 or winch 113, may prevent refloating of the cage.

Yet another problem arises from the fact that the depth to which cage 100 is submerged must be fixed apriori by choosing the length of fish cage cables 104. Once sinker 108 hits bottom, the length of cables 104 cannot be changed, and no further changes in the submersion depth of cage 100 are possible.

An additional problem arises if cage 100, while being submerged, needs to be stopped at some intermediate depth before sinker 108 hits bottom. In this situation, sinker cable 110 may rub frequently against cage 100, in particular against its members 106, so that after a few hours, the friction may rupture cable 110 or slice through a member 106. There is therefore a maximum "intermediate depth stopover time" beyond which damage will occur, this time being shortened significantly by bad weather conditions.

A yet additional problem arises with a submerged cage 100 and a floating buoy 112, the latter changing its position according to wind and water current directions. The moving buoy may cause cable 110 to wrap around and get entangled with cables 104 and members 106. An attempt to refloat cage 100 in such a situation may lead to the rupture of cable 110. Attempts to free such an entangled cable 110 require complicated underwater operations using divers.

There is thus a recognized need for, and it would be advantageous to have, a farming system for use in deep waters comprising a fish cage of controlled buoyancy, and a method to submerge and refloat such a fish cage that are devoid of the above problems and limitations.

SUMMARY OF THE INVENTION

According to a preferred embodiment of the present invention there is provided a fish farming system, comprising: a fish cage of controllable buoyancy, a winch mechanism attached to the cage, a sinker having a sinker cable of variable length connected to the winch mechanism, an activator mechanism to activate the winch mechanism, the activation thereby defining an effective length of the sinker cable, whereby at least a portion of the fish cage is located at or above the water surface when the buoyancy overcomes the combined force exerted by the weight of the system, and whereby the fish cage is submerged at a desired depth below the water surface when the buoyancy is controllably reduced, the depth being determined by the effective length of the sinker cable.

According to further features in preferred embodiments of the present invention described below, the fish cage includes a plurality of vertical buoyancy elements for imparting the controllable buoyancy.

According to still further features in the described preferred embodiments, the activator mechanism includes a motor capable of receiving wireless instructions, the motor connected to the winch mechanism.

According to still further features in the described preferred embodiments, the activator mechanism further comprises a communication and control conduit functionally connected at one of its ends to the winch mechanism, a remote controller connected to the conduit at its other end, and an auxiliary floating device containing the remote controller, whereby the remote controller and the conduit facilitate activation of the winch mechanism when the winch mechanism is submerged, and the auxiliary floating device prevents the remote controller from being submerged together with the winch mechanism.

According to still further features in the described preferred embodiments, the fish cage includes at least one chamber.

According to still further features in the described preferred embodiments the fish farming system of the present invention further comprises an anchor connected to the fish cage through an anchor cable, and an anchor buoy connected to the anchor cable.

According to still further features in the described preferred embodiments, the anchor buoy comprises a variable buoyancy.

According to still further features in the described preferred embodiments, the system of the present invention further comprises at least one work platform attached to at least one chamber, whereby the winch mechanism is mounted on the platform.

According to still further features in the described preferred embodiments, the system of the present invention further comprises at least one chamber with a cross section lying in a plane substantially parallel to the water surface, which may have a square, round, hexagonal or octagonal shape.

According to still further features in the described preferred embodiments, the system of the present invention further comprises a telemetry device attached to the fish cage.

According to a preferred embodiment of the present invention there is provided a fish farming system, comprising: a fish cage of fixed buoyancy, a winch mechanism attached to the cage, a variable buoyancy sinker having a sinker cable of variable length, the sinker connected to the winch mechanism by the sinker cable, an activator mechanism to activate the winch mechanism, the activator mechanism thereby defining an effective length of the sinker cable, whereby at least a portion of the fish cage is located at or above the water surface when the fixed buoyancy of the cage overcomes the combined force exerted by the weight of the system, and whereby the fish cage is submerged at a desired depth below the water surface when the variable sinker buoyancy is controllably reduced, the depth determined by the effective length of the sinker cable.

According to another embodiment of the present invention there is provided a method of controllably submerging and refloating a fish farming system in deep waters, comprising: providing a fish cage of controllable buoyancy, the fish cage including at least one chamber, attaching a winch mechanism to the cage, connecting a sinker having a sinker cable of variable length to the winch mechanism through the sinker cable, activating the winch mechanism to change the effective length of the sinker cable, and changing the buoyancy of the fish cage, whereby at least a portion of the fish cage floats at or above the water surface when the buoyancy overcomes the combined force exerted by the combined weight of the system, and whereby the fish cage is submerged at a desired depth below the water surface when the buoyancy is controllably reduced, the depth determined by the effective length of the sinker cable.

According to additional features in the described preferred embodiments of the method of the present invention, the activating step includes the use of wireless transmission of instructions.

According to yet additional features in the described preferred embodiments of the method of the present invention, the activating step further comprises functionally connecting a communication and control conduit at one of its ends to the winch mechanism, functionally connecting a remote controller to another end of the conduit, attaching the remote controller to an auxiliary floating device to prevent the remote controller from being submerged, and transmitting control inputs from the remote controller through the conduit to the winch mechanism to activate the winch mechanism.

According to yet additional features in the described preferred embodiments, the method of the present invention further comprises attaching a platform to the cage, and mounting the winch mechanism on the platform.

According to yet additional features in the described preferred embodiments, the method of the present invention further comprises connecting an anchor having an anchor cable to the cage through the anchor cable, and connecting a variable buoyancy buoy to the anchor cable.

According to the present invention there is provided a variable buoyancy buoy, comprising a fixed buoyancy section and a variable buoyancy section attached to the fixed buoyancy section, whereby the buoyancy of the variable buoyancy buoy decreases as the buoy is being submerged.

The present invention successfully addresses the shortcomings of presently known configurations by providing a fish farming system and method for submerging and refloating a fish cage free of prior art limitations.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 is a schematic description of a fish cage of the present invention having multiple chambers in the shape of: (a) squares; (b) circles; (c) hexagons; and (d) octagons;

FIG. 6 is a schematic description of a preferred embodiment of the fish cage of the present invention: (a) floating at the water surface; and (b) submerged using a "passive" mode;

FIG. 7 is a schematic description of a preferred embodiment of the fish cage of the present invention: (a) floating at the water surface; and (b) submerged using an "active" mode;

DESCRIPTION OF THE PREFERRED EMBODIMENTS

The present invention is of a fish farming system which can be used to grow fish in a body of water of which any depth, particularly deep waters in the open seas, and which gives the ability of submerging a fish cage to virtually any desired depth at a controlled rate. The principles and operation of a system according to the present invention may be better understood with reference to the drawings and the accompanying description.

Figure 3:
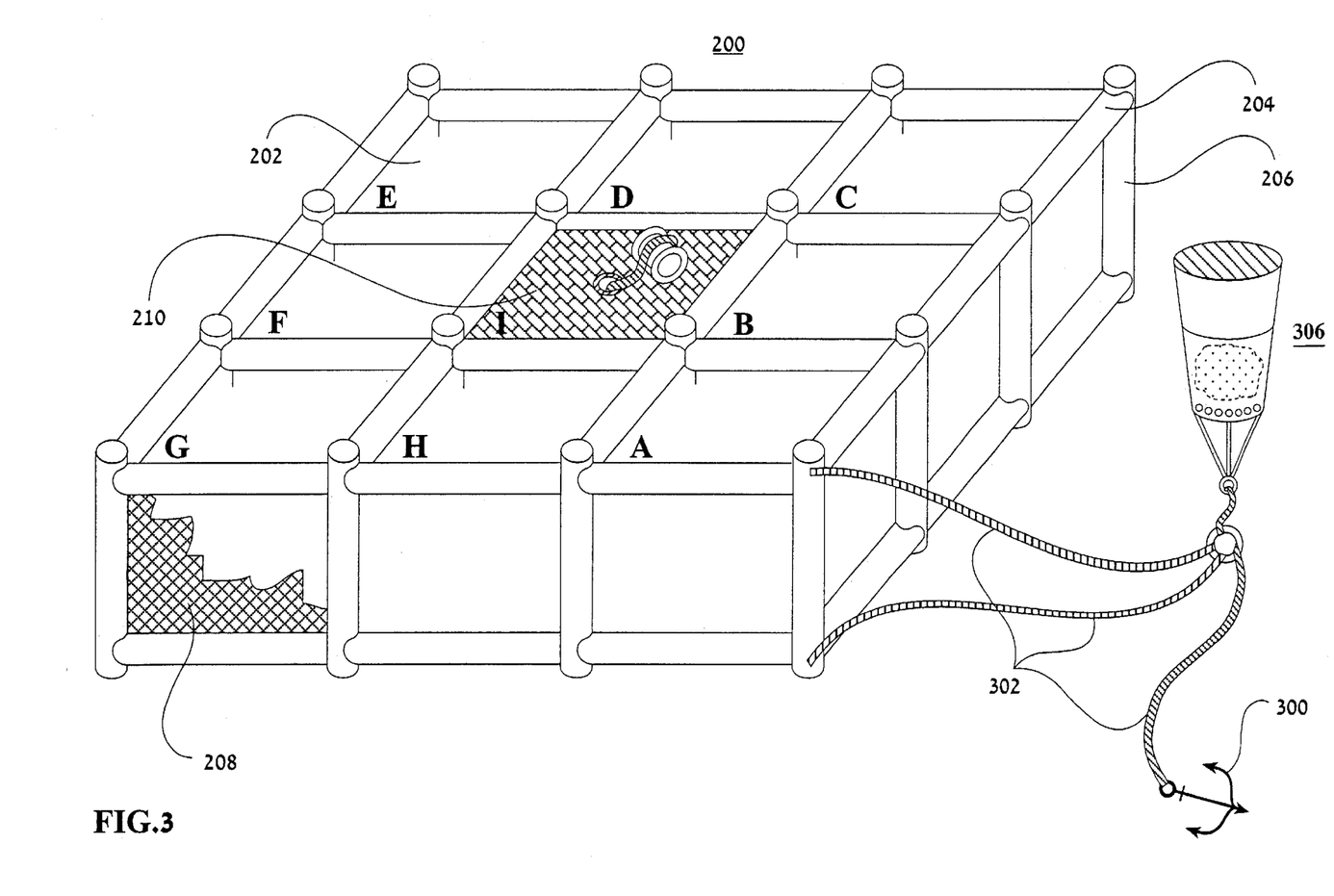
FIG. 3 is a schematic description of a preferred embodiment of a multiple chamber fish cage according to the present invention.
Figure 4A:
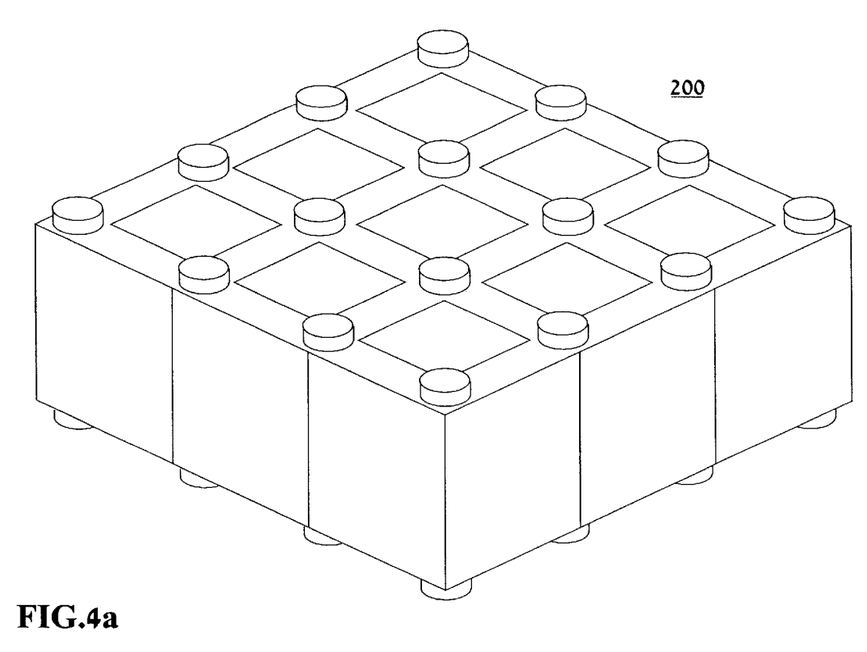
Figure 4B:
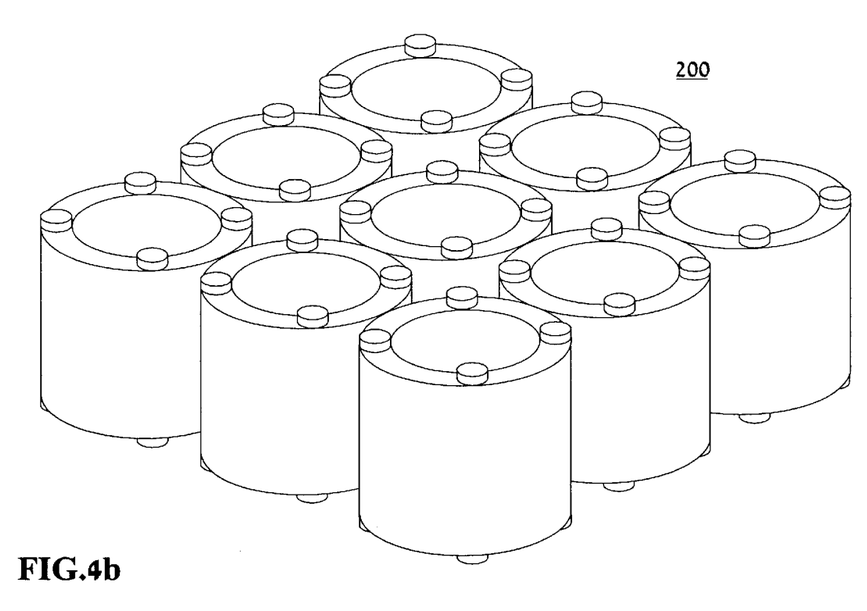
Figure 4C:
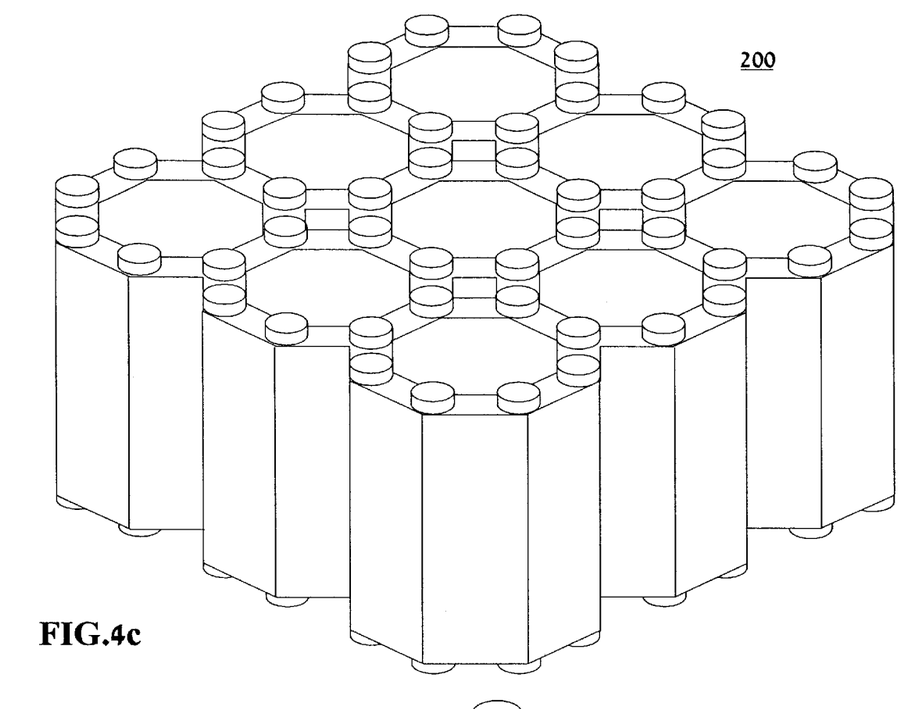
Figure 4D:
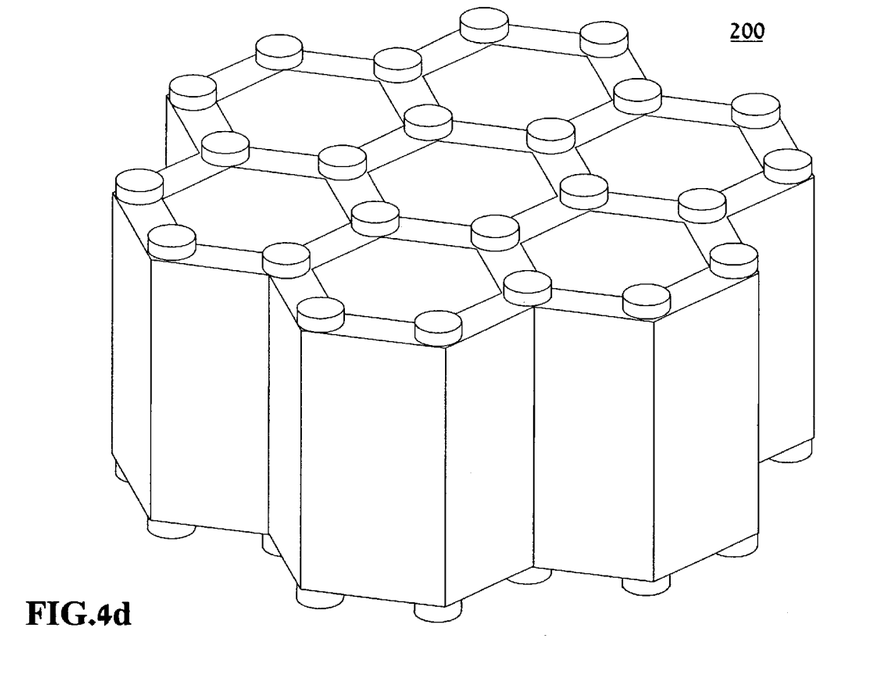

Referring now to the drawings, FIG. 3 illustrates a typical system according to the present invention. The system includes a fish cage 200 of any suitable size and dimensions, including, but not limited to, the designs of the prior art system shown in FIGS. 1 and 2, as well as many others. Preferably, fish cage 200 includes a number of adjacent chambers 202 of equal height, and with a horizontal cross section (substantially parallel to the water surface) of any suitable geometrical shape. The fish cage in FIG. 3 is shown including nine rectangular such chambers marked A to I (I being the central chamber which, as explained below, may be covered and therefore may not serve as a breeding chamber). Regarding other possible chamber cross-sections, FIG. 4 shows fish cages with nine chambers with cross sections in the shape of: (a) squares; (b) circles; (c) hexagons; and (d) octagons. Other shapes are of course possible, and are omitted herein only for the sake of simplicity. Typically, cage 200 and chambers 202 are made of a metal, hard plastic or any other suitable material skeleton structure with horizontal members 204 and vertical members 206. Members 204 and 206 are not shown in detail in the embodiments of FIG. 4, however, it is understood that they exist and are preferably similar to those in FIG. 3. On the skeleton there is superimposed a netting 208 (shown partially) of suitable mesh size which allows water to flow freely through the chambers but does not allow fish inside the chambers to escape. Members 204 and 206 are typically hollow pipes, preferably of steel, aluminum or hard plastic, most preferably provided with separate control means for the introduction and release of air, thus being capable of serving as buoyancy elements. Preferably, the central chamber in each of the structures shown in FIG. 4 is covered by a work platform 210. Platform 210 typically serves as a central area for activities such as maintenance, service and fish feeding. In a preferred embodiment of the system shown in FIG. 5, platform 210 serves as a support structure for means for alternately shortening and lengthening the effective length of a sinker cable 212, such means being preferably a suitable winch mechanism 214. Winch mechanism 214 may be operated by an electric, pneumatic, hydraulic, or any other waterproof motor. Most preferably, mechanism 214 is a "Windlass" type mechanism, in which case part of sinker cable 212 may be stored in a cable storage 213. Mechanism 214 is referred to hereafter as winch 214. Platform 210 may be made of any suitable material that can withstand the marine underwater environment for extended periods of time, for example steel, aluminum or hard plastic plate or mesh. Instead of being mounted on platform 210, winch 214 may also be attached to cage 200 directly, for example through rigid beams connected between horizontal members 204, without platform 210 being present. However, the presence of platform 210 enhances the access to winch 214 and simplifies its operation. Access to areas on top of chambers 202 which are not contiguous with platform 210 may be provided by additional walkway type structures (not shown) laid atop chambers 202 and connected to platform 210.

Figure 5:
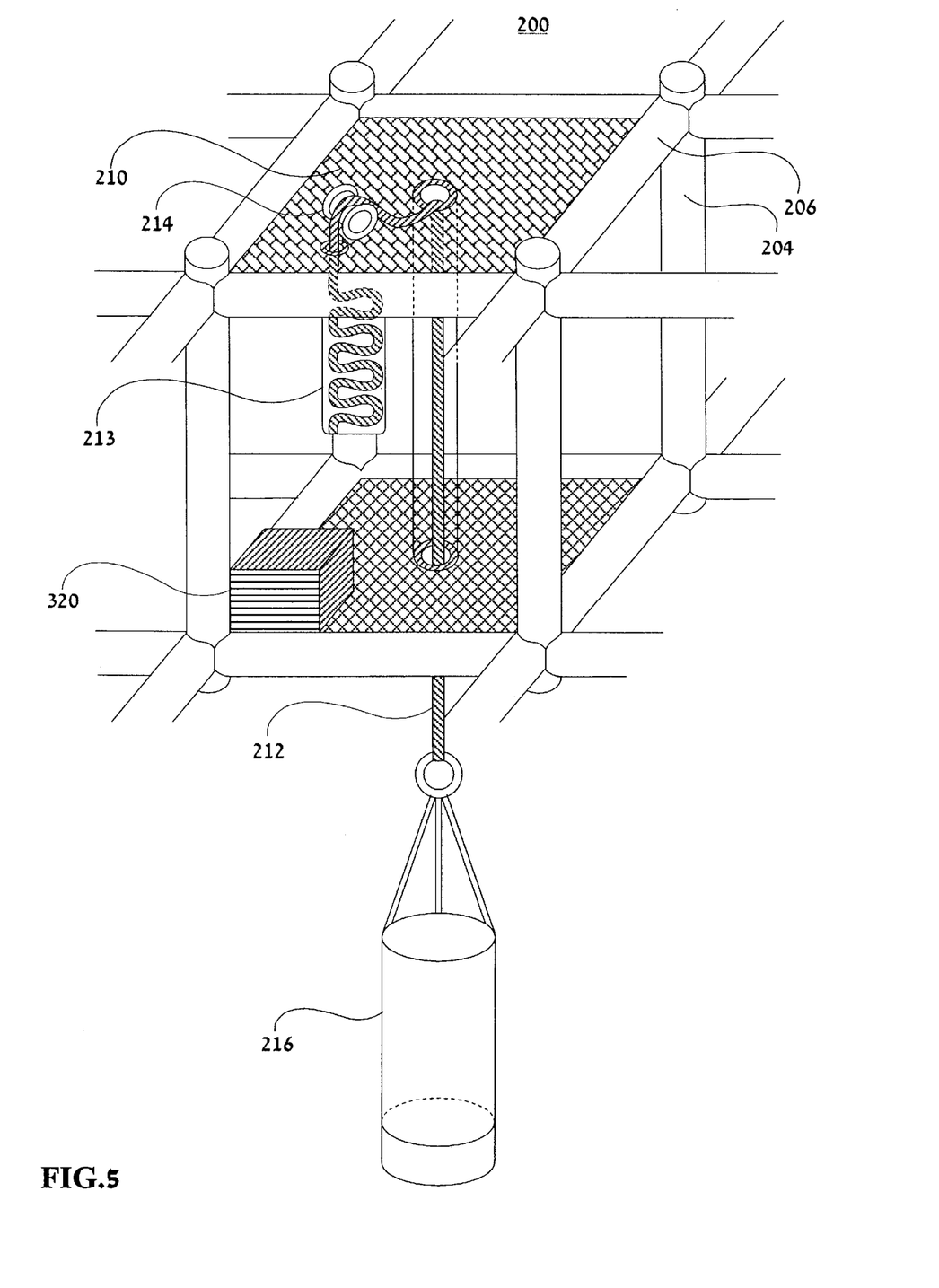
FIG. 5 is an enlarged detail of the central chamber of a fish cage covered by a platform, showing a winch attached to the platform, and a sinker attached to the winch through a sinker cable.

In FIG. 5, a sinker 216 is shown attached to an end of sinker cable 212. Sinker 216 may be of any suitable design and may contain solid and/or liquid and/or gas. The term "cable" as used herein is to be understood to include cables, chains, ropes, and the like made of various materials and of designs, provided they are suitable for the purposes described herein. The buoyancy of cage 200 is controllable and changeable, preferably by introducing and removing air or water in vertical buoyancy members 206 in a manner disclosed for example in U.S. Pat. No. 5,655,938 and the references therein, which are incorporated herein for all purposes as if fully set henceforth. Alternatively, a variable buoyancy sinker of the type described in U.S. Pat. No. 5,412,903 may provide the controllable and changeable buoyancy required to submerge and refloat cage 200, in which case the buoyancy of cage 200 itself may be fixed. "Variable buoyancy" as attributed to a sinker means that the weight of the sinker (which always has a negative buoyancy) can be changed by, for example, introducing and removing air. When the buoyancy of the fish farming system is directed upward, at least the upper portion of cage 200 floats at or somewhat above the surface of the water, as shown in FIGS. 6a and 7a, which is the normal condition for the raising of fish.

Figure 6:
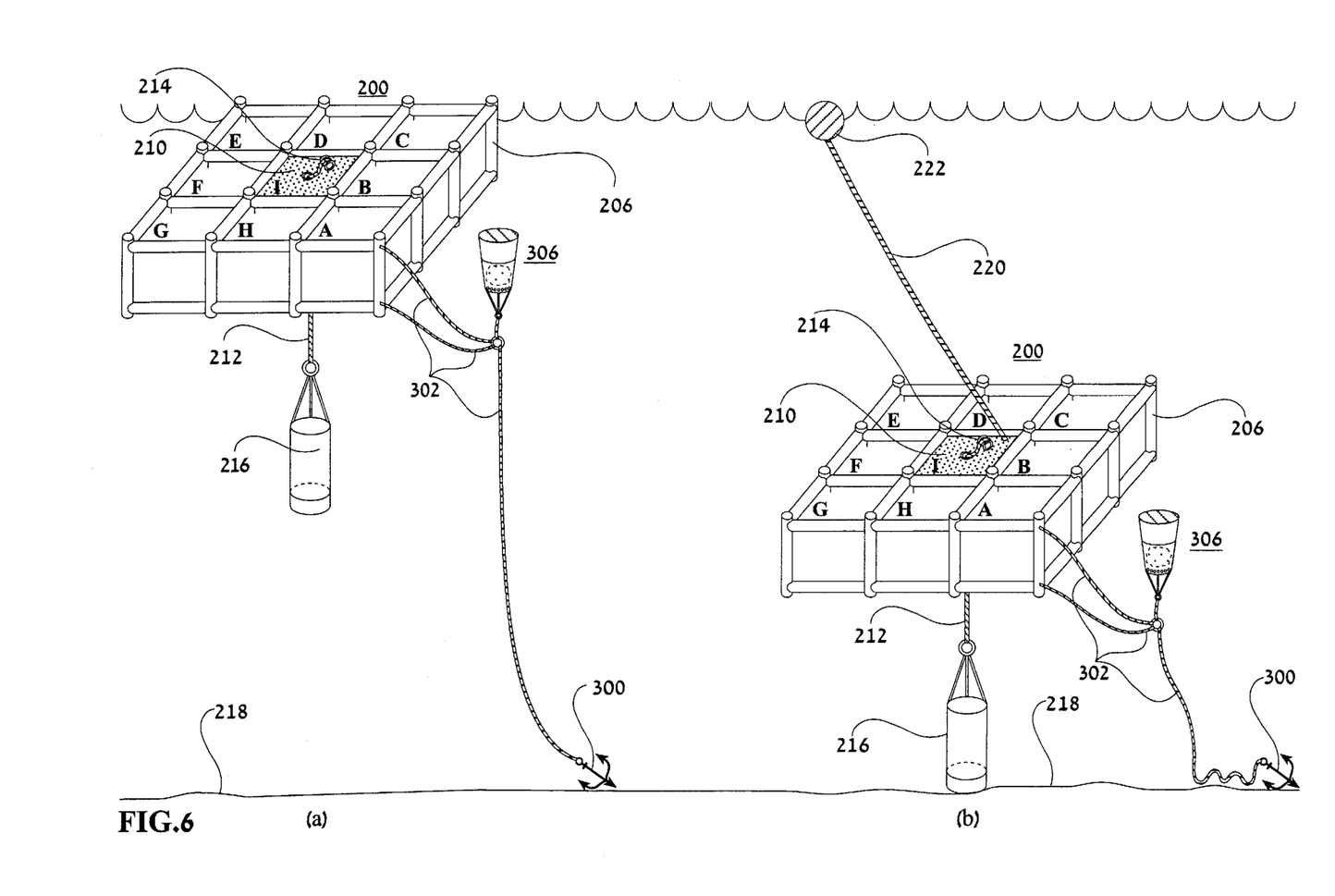

Cage 200 may be submerged whenever desired in one of two preferred ways or modes, referred to hereafter as a "passive" mode and an "active" mode. FIG. 6 shows the "passive" mode, In a first step shown in FIG. 6a, sinker cable 212 is first allowed to lengthen, preferably at a controlled rate, by, for example, releasing a brake mechanism on winch 214 located on platform 210. The weight of sinker 216, which pulls sinker cable 212 out of winch 214, causes sinker cable 212 to lengthen as sinker 216 goes deeper. When the effective length of sinker cable 212 reaches a predetermined value, roughly equal to the vertical distance that the submerged cage will assume from a sea bottom 218 when sinker 216 lies on bottom 218, sinker cable 212 is locked by, for example, engaging the brake mechanism on winch 214. The upward buoyancy of cage 200 is then slightly and controllably reduced by, for example, releasing air from one or more vertical members 206 through valves attached at their top ends, to which there is easy access from work platform 210 via the (not shown) walkways. Members 206 typically have open bottoms through which water can enter when air is released at the top, reducing the buoyancy until the weight of sinker 216 is sufficient to bring about the submersion of cage 200. The air release is then stopped. A second step of the "passive" mode shown in FIG. 6b in which cage 200 is submerged then takes place. Preferably, the submersion takes place at a slow rate in order to minimize or eliminate damage to the structures and to the fish. The submersion of cage 200 continues as long as sinker 216 exerts forces on cage 200. As soon as sinker 216 hits bottom 218 these forces are eliminated and cage 200 ceases to move downwardly, thus remaining submerged at a chosen depth, as shown in FIG. 6b.

The activation of winch 214, including the release and locking of the brake mentioned above is enabled by an activation mechanism defined below. For example, in order to float cage 200 back to the surface, winch 214 may be activated by remote control signals or inputs, transmitted from a remote controller (not shown) positioned above the water, through wired or wireless communication means, to the submerged winch. An example of wired means is a communication and control conduit 220 functionally (e.g. electrically) connected at one of its ends to winch 214, and at its other end to the remote controller which is itself attached to, or contained in, an auxiliary floating device, for example a buoy 222. Conduit 220 and buoy 222 are shown in FIG. 6b. The remote controller may include transmitters and electronics needed to transmit orders to winch 214, diagnostic systems to indicate the status of winch 214, a GPS navigation system, pumps and controls for hydraulic or pneumatic systems, etc. Typical inputs may consist of electrical or electronic signals, oil circulation in a hydraulic system, compressed air for a pneumatic system, etc. Conduit 220 may be a cylindrical hollow tube of suitable materials such as steel, rubber, nylon, plastic, etc. which typically contains hydraulic or compressed air pipes and electrical cables, needed to activate a torque device such as a hydraulic, pneumatic or electric motor located in proximity, and connected to, winch 214. Winch 214 may also be activated by a torque device located near it that does not require a physical connection to the water surface of, for example, hydraulic or pneumatic pipes, and that can receive remote wireless instructions. Such a device may be for example an electric motor supplied with its own batteries, a pneumatic motor supplied with attached compressed air cylinders or more generally any motor connected to its own adjacent source of energy. Such a motor may then have attached electronic receivers enabling it to receive remote control instructions from the remote controller, in which case conduit 220 is not necessary and may be replaced by wireless channels for wireless transmission of instructions. Thus, winch 214 may also be activated by wireless means, which are known in the art. In the present invention, the term "activator mechanism" is used as a general term for all the means needed to activate the winch in the submerging and refloating actions, including the remote controller, the torque device, and the communication conduit or wireless communication means as described above.

In emergency situations when wire or wireless signals cannot reach it, or if it gets stuck, sunken winch 214 may be activated manually, for example by divers. The activation of winch 214 releases sinker cable 212, preferably in a slow and controlled manner, and cage 200 then rises slowly to the water surface, due to its upward buoyancy, which is not affected by sinker 216, which continues to lie on bottom 218. Once cage returns to the water surface, air is pumped into members 206 to increase the buoyancy to the point where it overcomes the weight of sinker 216. Alternatively (albeit less preferably, because this requires supplying air to the sunken sinker), if sinker 216 has a variable and controllable buoyancy as described in U.S. Pat. No. 5,412,903, its buoyancy may be slightly increased so that the buoyancy of the cage can overcome the weight of the sinker and the sinker cable. Sinker 216 is then pulled up slowly to any required position.

Figure 7:
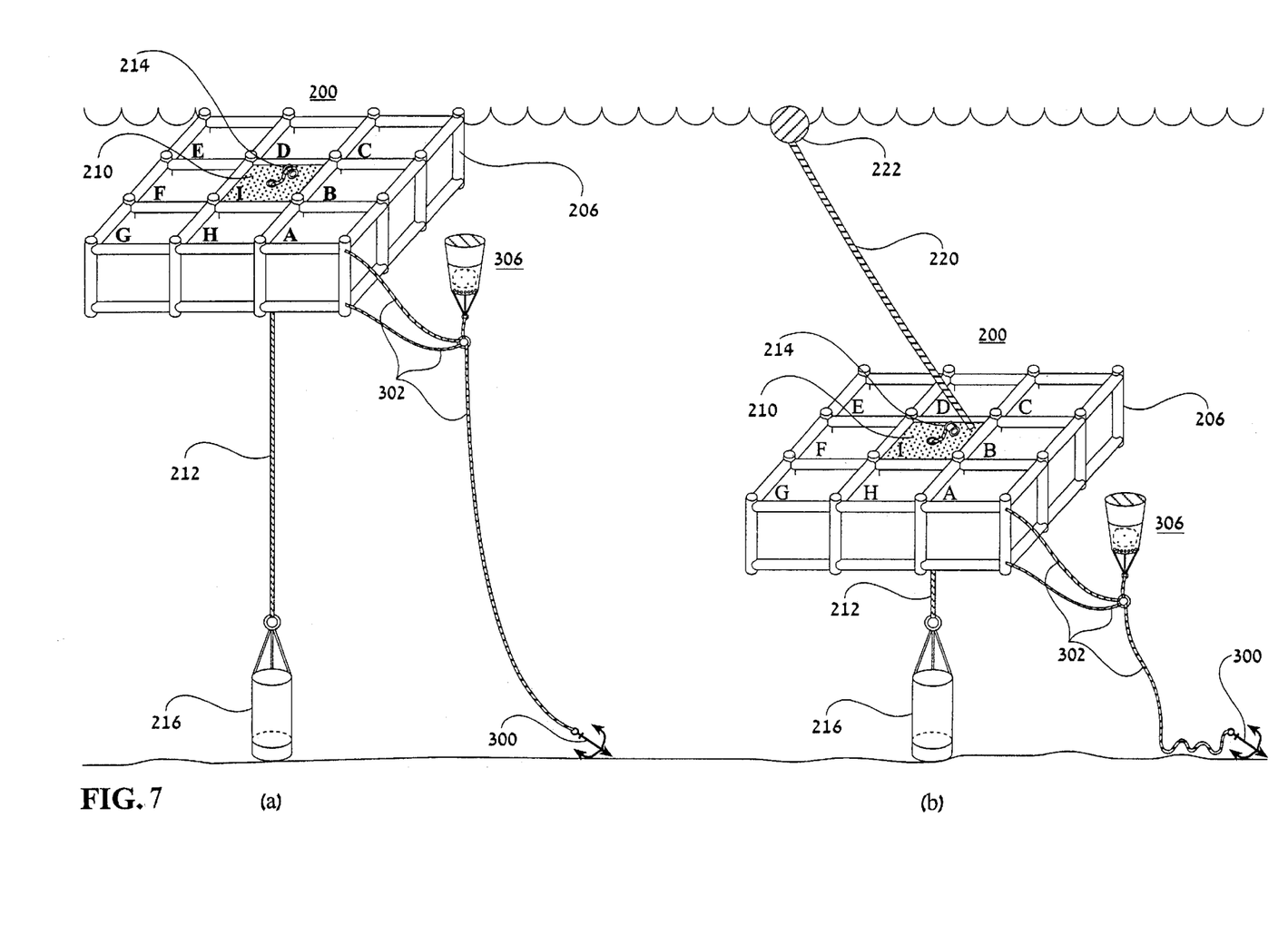

The active mode of submerging and raising cage 200 is shown in FIG. 7. In FIG. 7a, cage 200 floats at the water surface. Winch 214 is activated with the help of the activator mechanism, and sinker cable 212 is released slowly until sinker 216 hits bottom 218. Winch 214 is locked, and air is bled from one or more members 206, reducing the buoyancy slightly to the point where it can overcome the combined weight of cage 200 and sinker cable 212 but not the addition of the weight of sinker 216. Winch 214 is now activated, so that the length of sinker cable 212 is slowly reduced. As shown in FIG. 7b, cage 200 is now slowly submerged, because sinker 216 remains on bottom 218 while cage 200 is being pulled towards it. When cage 200 reaches the required depth, winch 214 is deactivated and sinker cable 212 is locked. The cage can be floated back to the surface following the same sequence of steps described for the "passive" case hereabove. Note that in contrast with the system of Zemach et al in '903, in the present invention the depth of the submerged cage 200 can be changed easily, by remotely activating the activator mechanism, and through it, winch 214.

The system of the present invention as shown in FIGS. 3, 6 and 7 also includes a single-point mooring system comprising an anchor 300 connected through an anchor cable 302 to cage 200. An anchor buoy 306 is connected to anchor cable 302. One function of buoy 306 is to indicate position. Buoy 306 sinks together with cage 200 when the cage is submerged. Another, and quite important function of buoy 306 is to absorb shocks imparted to cage 200 as a result of tension changes between cable 302 and cage 200 during rough weather. Another main function is to support some of the weight of anchor cable 302. When cage 200 is submerged, an increasing part of anchor cable 302 will lie on the sea bottom, and cable 302 will require less support from buoy 306. If the buoyancy of buoy 306 is fixed, the buoy will tend to rise in the water higher than cage 200, and there is a danger that it will get entangled with conduit 220. The buoyancy of buoy 306 must therefore be reduced as the submersion depth of cage 200 increases. According to the present invention, this is accomplished by providing a variable buoyancy to anchor buoy 306, as shown in more detail in FIG. 8. The "variable buoyancy" buoy 306 comprises two main sections, a top fixed buoyancy section 308, and a bottom variable buoyancy section 310. Preferably, section 308 has a conventional, rigid, fixed volume, hollow structure as practiced in the art, while section 310, which is positioned below section 308 and attached to it by any suitable attachment means, has a flexible, variable volume hollow structure. Section 310 may be for example a bag made of rubber, plastic or other airtight flexible material, which is normally filled with air to a given pressure while buoy 306 floats at the surface, and which is placed inside a rigid hollow enclosure 330 which is riveted, welded or connected by any other suitable means to section 308. Section 310, once filled with air, cannot be taken out or escape from enclosure 330.

Figure 8:
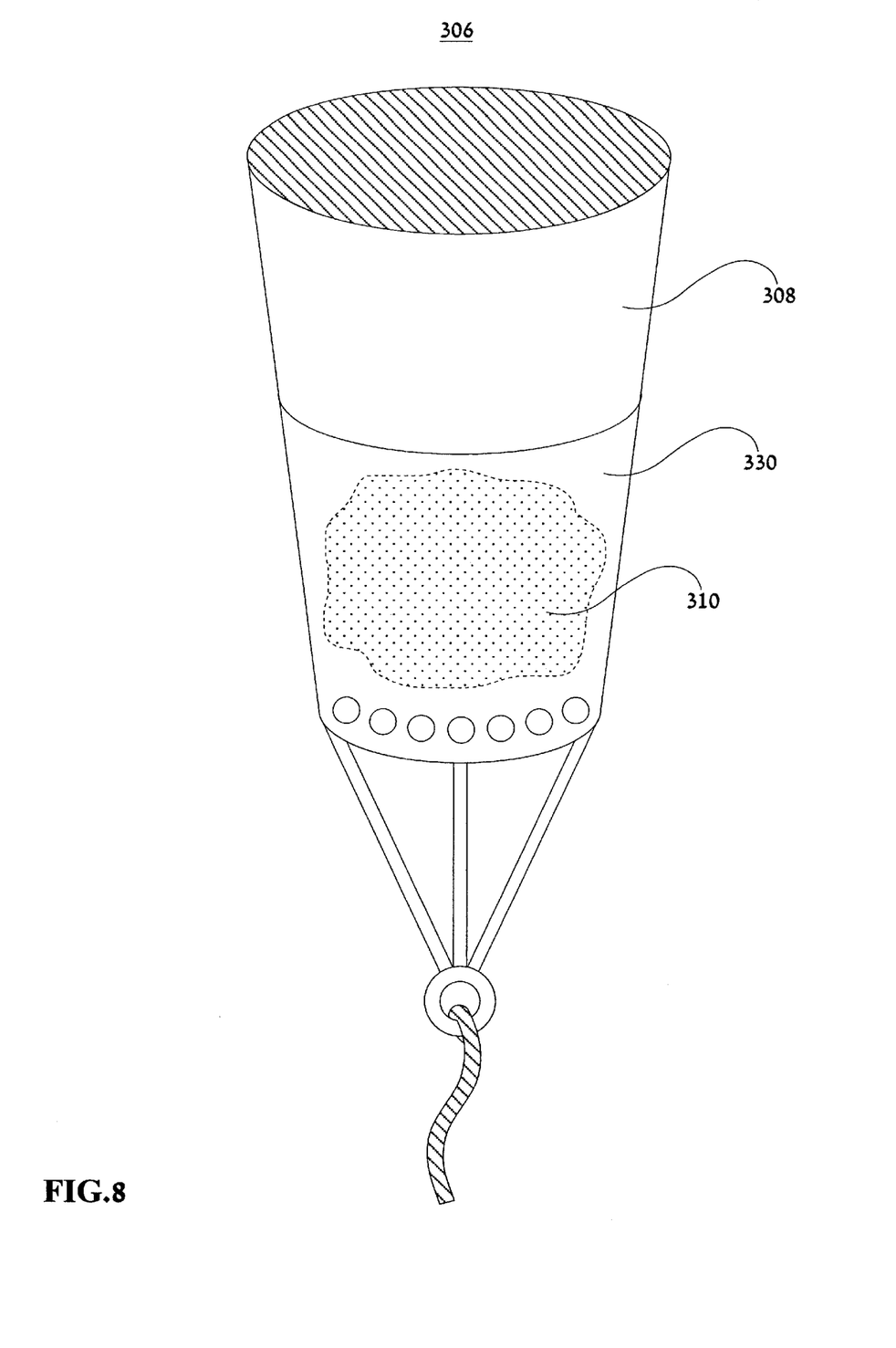
FIG. 8 is a schematic view of a variable buoyancy anchor buoy according to the present invention.

When buoy 306 sinks, being pulled down by the submerging cage, the increasing pressure on section 310 compresses the air inside it, causing its volume to decrease, therefore reducing its buoyancy. The buoyancy of section 310 and therefore of buoy 306 decreases with increasing submersion depth, causing buoy 306 to remain closer to cage 200, thus avoiding the entanglement danger mentioned above.

The single-point mooring system of the present invention offers additional significant advantages over prior art systems, including advantages over the singlepoint mooring system of U.S. Pat. No. 5,412,903. One significant advantage is that cage 200 will always be positioned with the chambers closest to anchor buoy 306 (chambers A, B and H in FIGS. 3, 6 and 7) facing the incoming currents or "upstream", while the chambers farthest from buoy 306 (E, F and D) will be "downstream". If the currents change direction, cage 200 will simply rotate around the mooring point to face them with chamber A. This "self adjusting" cage directionality can be used to great advantage, by positioning the fish population according to size, largest fish in chambers closest to the incoming current (e.g. chamber A), and smallest fish in cages at the other diagonal end (e.g. chamber E). Such an organization of the fish farm helps greatly in at least three aspects: firstly, larger fish need more oxygen, which is most plentiful in the chambers which face the incoming currents; secondly, smaller fish which need less oxygen are also more protected in chambers farther away from the incoming current; and thirdly, a cage moored around a single point can rotate around it in a radius almost as large as the length of anchor cable 302, allowing the waste generated by the fish to be spread out over a larger area, thus reducing potential problems which may arise from the waste, such as illnesses.

The system of the present invention also includes a telemetry device 320 containing various telemetry means, such as temperature measurement devices, depth indicators, acoustic detectors, video cameras, etc. which may be attached at a convenient location to cage 200, as shown in FIG. 5, and which may relay information to a remote used positioned out of the water by wireless or wired means known in the art.

While the invention has been described with respect to a limited number of embodiments, it will be appreciated that many variations, modifications and other applications of the invention may be made.

What is claimed is:

1. A fish farming system, comprising:
   a. a fish cage of controllable buoyancy;
   b. a winch mechanism attached to said cage;
   c. a sinker having a sinker cable of variable length, said sinker connected to said winch mechanism by said sinker cable; and
   d. an activator mechanism to activate said winch mechanism, said activator mechanism thereby defining an effective length of said sinker cable, whereby
   at least a portion of said fish cage is located at or above the water surface when said buoyancy overcomes the combined force exerted by the weight of said system, and whereby said fish cage is submerged at a desired depth below the water surface when said buoyancy is controllably reduced, said depth determined by said effective length of said sinker cable.

2. The system of claim 1, wherein said fish cage includes a plurality of vertical buoyancy elements for imparting said controllable buoyancy.

3. The system of claim 2, said activator mechanism further comprising:
   a. a communication and control conduit functionally connected at one of its ends to said winch mechanism;
   b. a remote controller functionally connected to said conduit at another end of said conduit; and
   c. an auxiliary floating device containing said remote controller, whereby
   said remote controller and said conduit facilitate activation of said winch mechanism when said winch mechanism is submerged, and said auxiliary floating device prevents said remote controller from being submerged together with said winch mechanism.

4. The system of claim 2, wherein said fish cage includes at least one chamber.

5. The system of claim 4, further comprising an anchor having an anchor cable and connected to said cage through said anchor cable, and an anchor buoy connected to said anchor cable.

6. The system of claim 5, wherein said anchor buoy comprises a variable buoyancy.

7. The system of claim 6, further comprising a telemetry device attached to said fish cage.

8. The system of claim 4, said at least one chamber comprising a cross section selected from the group consisting of square, round, hexagonal or octagonal, said cross section lying in a plane substantially parallel to the water surface.

9. The system of claim 4, further comprising at least one work platform attached to said at least one chamber, whereby said winch mechanism is mounted on said at least one platform.

10. The system of claim 1, wherein said activator mechanism includes a motor capable of receiving wireless instruction, said motor functionally connected to said winch mechanism.

11. A fish farming system, comprising:
   a. a fish cage of fixed buoyancy;
   b. a winch mechanism attached to said cage;
   c. a variable buoyancy sinker having a sinker cable of variable length, said sinker connected to said winch mechanism by said sinker cable; and
   d. an activator mechanism to activate said winch mechanism, said activator mechanism thereby defining an effective length of said sinker cable, whereby
   at least a portion of said fish cage is located at or above the water surface when said fixed buoyancy of said cage overcomes the combined force exerted by the weight of said system, and whereby said fish cage is submerged at a desired depth below the water surface when the buoyancy of said variable buoyancy sinker is controllably reduced, said depth determined by said effective length of said sinker cable.

12. A method of controllably submerging and refloating a fish farming system in deep waters, comprising:
   a. providing a fish cage of controllable buoyancy, said fish cage including at least one chamber;
   b. attaching a winch mechanism to said cage;
   c. connecting a sinker having a sinker cable of variable length to said winch mechanism through said sinker cable;
   d. activating said winch mechanism to change the effective length of said sinker cable; and
   e. changing said buoyancy of said fish cage, whereby
   at least a portion of said fish cage floats at or above the water surface when said buoyancy overcomes the combined force exerted by the combined weight of said system, and whereby said fish cage is submerged at a desired depth below the water surface when said buoyancy is controllably reduced, said depth determined by said effective length of said sinker cable.

13. The method of claim 12, said activating step including the use of wireless transmission of instructions.

14. The method of claim 12, said activating step further comprising:
   a. functionally connecting a communication and control conduit at one of its ends to said winch mechanism;
   b. functionally connecting a remote controller at another end of said conduit;
   c. attaching said remote controller to an auxiliary floating device to prevent said remote controller from being submerged; and
   d. transmitting control inputs from said remote controller through said conduit to said winch mechanism to activate said winch mechanism.

15. The method of claim 12, further comprising:
   a. attaching a platform to said cage; and
   b. mounting said winch mechanism on said platform.

16. The method of claim 15, further comprising:
   a. connecting an anchor to said cage through an anchor cable; and
   b. connecting a variable buoyancy buoy to said anchor cable.

\* \* \* \* \*